United States Patent Office 3,076,788
Patented Feb. 5, 1963

3,076,788
PROCESS OF PRODUCING α-ISOCYANATO ETHERS AND PRODUCTS THEREOF
Fred W. Hoover, Wilmington, Del., assignor to E. I. du Pont de Nemours and Company, Wilmington, Del., a corporation of Delaware
No Drawing. Filed Feb. 27, 1959, Ser. No. 795,915
22 Claims. (Cl. 260—77.5)

This invention relates to, and has as its principal objects provision of, the reaction of isocyanic acid with alpha-beta unsaturated ethers and new α-isocyanato ethers obtained thereby.

Isocyanates are a relatively reactive class of compounds which have achieved considerable importance in recent years as intermediates. They react with amine, carboxyl and hydroxyl groups. Polyisocyanates are particularly important in view of the ease of polymer formation or cross-linking reactions with compounds containing a plurality of reactive amine, hydroxyl, or other groups.

It has now been found that isocyanic acid reacts with ethers in which an ether oxygen has only one ethylenic group directly attached thereto to produce α-isocyanato ethers. New ethers thus produced include those of Formula I:

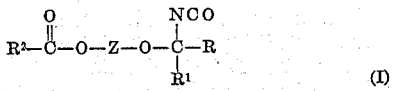

wherein R=H or lower alkyl (up to 4 carbons), $R^1$ is hydrocarbon of not more than 10 carbons, $R^2$ is hydrocarbon of up to 6 carbons and Z is hydrocarbon or oxygen-interrupted hydrocarbon having a chain of at least two carbons, preferably an alkylene of 2–3 carbons; deithers of Formula II:

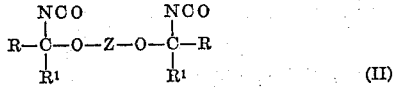

wherein R and $R^1$ and Z are as previously defined; and ethers of Formula III:

wherein $R^3$ is an aliphatically saturated organic radical of up to 10 carbons, preferably of not more than 6, and $R^1$ and $R^3$ together can be an alkylene radical. Preferably R is hydrogen, $R^1$ is hydrocarbon of up to 4 carbons, $R^2$ is hydrocarbon of up to 3 carbons and $R^3$, which includes alkyl, cycloalkyl, aryl, and aralkyl, generally has up to 6 carbons.

The process of this invention involves the addition of isocyanic acid to unsaturated ethers in which any ether oxygen has no more than one ethylenic group directly attached. The isocyanato (—NCO) group thereby becomes attached to the alpha unsaturated carbon. The addition is facilitated by the presence of catalytic amounts of a strong acid. Although the presence of an added acid catalyst is not essential for the reaction, it is preferred that one be present. By acid catalyst is meant a compound having an open sextet of electrons (see Wheland, "Advanced Organic Chemistry," Wiley, N.Y., 1949, 2nd Ed., page 80, and Branch and Calvin, "The Theory of Organic Chemistry," Prentice-Hall, N.Y., 1941, pages 186–7). The preferred acids in aqueous solutions have a pKa of not more than 3. Suitable strong acid catalysts include metaphosphoric acid, sodium bisulfite, sulfamic acid, boron trifluoride, and zinc chloride. The amount of acid catalyst is not critical although amounts of 0.1 to 10% can be used. The catalyst is generally nonvolatile.

The temperature is generally below 75° C. and preferably 0–60° C. Although higher temperatures can be used, they are generally avoided to prevent polymerization of vinyl ethers and decomposition of isocyanic acid. The time for the reaction is generally not long, e.g., times of from a few minutes to an hour are sufficient. The time and temperature are generally dependent upon the rate of introduction of isocyanic acid to the ethylenically unsaturated ether.

Solvents or inert diluents can be present during the reaction. Although not essential, it is preferred that inert diluents such as ethers (ethyl ether) or hydrocarbons (pentane, benzene, xylene) be present to moderate the reaction and control the temperature.

The unsaturated ethers that can be used in the reaction are those that have an ether oxygen to which there is directly attached no more than one ethylenic group, i.e., the compound must have the group

These ethers generally have the vinylidene ($CH_2=C—$), including vinyl ($CH_2=CH—$), group directly attached to ether oxygen. Ethers of this general type that are capable of the addition reaction with isocyanic acid include those having only one ethylenic double bond such as

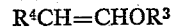

wherein $R^4$ is hydrogen and $R^3$ is a hydrocarbon radical of up to 10 carbons, especially alkyl, aryl, and with $R^4$, alkylene. Examples of such vinyl-type ethers are vinyl pentyl ether and vinyl naphthyl ether. When $R^3$ and $R^4$, taken together, are alkylene, they have 2–3 chain carbons. Vinyl ethers with two ethylenic unsaturations of which not more than one is directly attached to any ether oxygen particularly useful in the process of this invention are those of the general formula

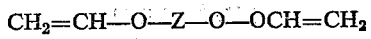

wherein Z is a divalent hydrocarbon or oxahydrocarbon radical free from ethylenic unsaturation and having at least two chain carbons, and in particular is a hydrocarbyl or oxygen-containing hydrocarbyl radical containing generally not more than 4 oxygens, e.g., the diradicals
—$CH_2CH_2OCOCH_2CH_2OCOCH_2CH_2$— and
—$CH_2CH_2OCH_2CH_2OCH_2CH_2$—

Preferred are ethylene, tri- and tetramethylene, although arylene, e.g., phenylene, can be present. A further important vinyl ether useful in the process of this invention contains an ester group as in the formula

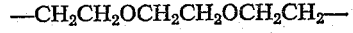

wherein $R^2$ is a hydrocarbon radical of up to 6 carbons including alkyl, e.g., $CH_3—$, $C_2H_5—$, $C_3H_7—$; alkenyl, e.g., $CH_2=CH—$, $CH_2=C(CH_3)—$, $CH_3CH=CH—$, $CH_3CH=CH—CH=CH—$; alkynyl, e.g., $CH\equiv C—$; and aryl, e.g., $C_6H_5—$. Preferred are those wherein $R^2$ is an alkenyl and Z is an alkylene radical of 2–3 carbons each.

Divinyl ethers contain two reactive ethylenic double bonds and are particularly desired since they give products having two isocyanate groups, useful in polymer formation and modification.

Ethers that have only one vinyl group directly attached to ether oxygen and contain additional aliphatic unsaturated groups are also particularly useful since isocyanic acid does not react with the additional unsaturated group and the resulting compounds are convertible to polymers. They are also useful as crosslinking agents or textile treating agents.

The novel isocyanates can be separated from starting materials and inert diluents by distillation. In general, the two reactants are employed in substantially molar ratios (although the ratio can vary from about 1:2 to 5:1).

The following examples further illustrate the process of this invention.

EXAMPLE I

1-Butoxyethyl Isocyanate

$CH_2=CHOC_4H_9+HNCO \rightarrow CH_3CH(OC_4H_9)NCO$

To a mixture of 9.6 g. of isocyanic acid and 25 g. of vinyl butyl ether was added at about 0° C. 10 ml. of dioxane containing 0.1 g. of p-toluenesulfonic acid. A mild exothermic reaction took place which subsided after a few minutes. Analysis by near infrared indicated that all of the vinyl ether and isocyanic acid had been consumed. On distillation, there was obtained 7 g. of 1-butoxyethyl isocyanate, B.P. 163° C./760 mm. or 69° C./38 mm., and $n_D^{25}$, 1.4080.

The infrared spectrum of this product showed strong absorption at $3.4\mu$ (CH), $4.4\mu$ (NCO), and $8.85\mu$

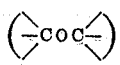

as would be expected for 1-butoxyethyl isocyanate. When a dioxane solution of this compound was treated with a drop of concentrated hydrochloric acid and then added to a solution of 2,4-dinitrophenylhydrazine, the hydrazone of acetaldehyde (M.P. 163–165° C., no depression with an authentic sample) was obtained in accordance with the indicated structure.

*Analysis.*—Calcd. for $C_7H_{13}O_2N$: C, 58.75; H, 9.09; N, 9.8; M.W. 143. Found: C, 59.17; H, 9.07; N, 10.27; M.W. 132.

1-butoxyethyl isocyanate was also obtained by adding a mixture of 50 g. of vinyl butyl ether and 14.9 ml. of isocyanic acid dropwise to a stirred mixture of 50 ml. of diethyl ether and 0.1 g. of p-toluenesulfonic acid. The rate of addition was adjusted so that a temperature of 38–40° C. was maintained. On distillation, there was obtained 53 g. (90% yield) of 1-butoxyethyl isocyanate.

EXAMPLE II

1-Ethoxyethyl Isocyanate $CH_2=CHOC_2H_5+HNCO \rightarrow C_2H_5OCH(CH_3)NCO$ A mixture of 7 ml. of isocyanic acid, 30 ml. of vinyl ethyl ether, 5 ml. of diethyl ether and 0.1 g. of p-toluenesulfonic acid was warmed slowly from −80° C. to room temperature. On distillation, there was obtained 8 g. (50%) of 1-ethoxyethyl isocyanate, B.P. 102–109° C. and $n_D^{25}$, 1.3975.

*Analysis.*—Calcd. for $C_5H_9O_2N$: C, 52.1; H, 7.8; N, 12.2. Found: C, 52.90; H, 8.07; N, 11.88.

The infrared spectrum was consistent with the assigned structure.

EXAMPLE III

2-Tetrahydropyranyl Isocyanate

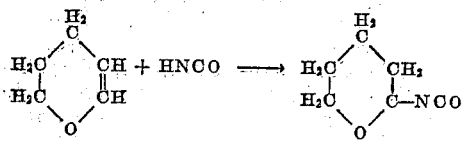

A mixture of 27.2 g. (.25 mole) of dihydropyran and 12.9 ml. (0.36 mole) of isocyanic acid, prepared at −80° C., was allowed to warm to 26° C., whereupon an exothermic reaction occurred with the formation of isocyanic acid polymer (4.7 g.) along with 2-tetrahydropyranyl isocyanate. On distillation, there was obtained 16 g. (51%) of tetrahydropyranyl isocyanate, B.P. 72° C./25 mm.; $n_D^{25}$, 1.4500.

*Analysis.*—Calcd. for $C_6H_9O_2N$: N, 11.02. Found: N, 11.06.

EXAMPLE IV

1-Phenoxyethyl Isocyanate

$C_6H_5OCH=CH_2+HNCO \rightarrow C_6H_5OCH(CH_3)NCO$

When a mixture of 6.5 g. (0.054 mole) of vinyl phenyl ether and 1.6 ml. (0.045 mole) of isocyanic acid was warmed to room temperature and then 0.05 g. of p-toluenesulfonic acid added, an exothermic reaction set in which subsided after 15–20 minutes. On distillation, 4.5 g. (80%) of 1-phenoxyethyl isocyanate, B.P. 42° C./0.4 mm. and $n_D^{25}$, 1.5057, was obtained.

*Analysis.*—Calcd. for $C_9H_9O_2N$: C, 66.30; H, 5.52; N, 8.60. Found: C, 66.04; H, 5.57; N, 8.23.

The infrared spectrum of this product was in agreement with the 1-phenoxyethyl isocyanate structure. Unequivocal evidence for this structure was provided by nuclear magnetic resonance, which showed methyl, aromatic, and tertiary hydrogens in the ratio of 3:5:1.

EXAMPLE V

1-Butoxy-1-Methylethyl Isocyanate

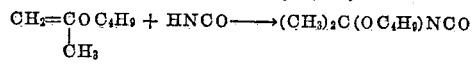

To a mixture of 12.6 g. of isocyanic acid, 25 ml. of benzene, and 0.05 g. of p-toluenesulfonic acid was added dropwise over a period of 24 minutes 22 g. of butyl isopropenyl ether (B.P. 114° C., $n_D^{25}$, 1.4076, prepared from 2,2-dibutoxypropane by the method of Crocker and Hall, J. Chem. Soc. 1952, 2052). The temperature rose from 29° C. to 44° C. during the period of addition. Distillation gave 22.2 g. (70%) of 1-butoxy-1-methylethyl isocyanate, B.P. 58° C./18 mm.; $n_D^{25}$, 1.4102. The structure of the product was confirmed by infrared spectroscopic analysis.

*Analysis.*—Calcd. for $C_8H_{15}O_2N$: N, 8.91. Found: N, 9.08, 9.14.

EXAMPLE VI

1,1'-(Ethylenedioxy)Diethyl Diisocyanate

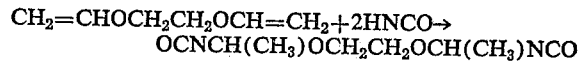
$CH_2=CHOCH_2CH_2OCH=CH_2+2HNCO \rightarrow$
$OCNCH(CH_3)OCH_2CH_2OCH(CH_3)NCO$ The divinyl ether of ethylene glycol (22.8 g., 0.2 mole) was added with stirring to a mixture of 30 ml. (0.84 mole) of isocyanic acid, 100 ml. of benzene and 0.1 g. of p-toluenesulfonic acid over a period of 20 minutes, during which time the temperature rose to 55° C. The reaction mixture was stirred for 20 additional minutes, and the product distilled under reduced pressure. After removal of the solvent and excess isocyanic acid, the residue was distilled through a short-pass still under a pressure of 0.3 mm. to separate the distillable products from the polymeric products, and the distillate redistilled through a short Vigreux column. There was obtained 31.8 g. (80% yield) of 1,1'-(ethylenedioxy)diethyl diisocyanate, B.P. 65° C./0.6 mm.; $n_D^{25}$, 1.4360.

*Analysis.*—Calcd. for $C_8H_{12}O_4N_2$: N, 14.00. Found: N, 13.93.

The divinyl ether of ethylene glycol was prepared in about 65% yield, according to the method of Favorskii (C.A., 38, 330 (1944)) by heating a mixture of 220 g. of ethylene glycol, 12 g. of potassium hydroxide pellets and acetylene in an autoclave at 150° C. for 22 hours.

In further studies, 1,1'-(ethylenedioxy)diethyl diisocyanate reacted with ethylene glycol at room temperature to form a clear, viscous polymer. This diisocyanate reacted with hexamethylenediamine to form a white polymer that melted about 150° C.

1,1'-(ethylenedioxy)diethyl diisocyanate has utility as an antistatic agent. For example, when a 4″ x 8″ piece of "Dacron" (Du Pont trademark for polyester fiber) (prepared from continuous filaments) was dipped into a solution containing 0.68 g. of this diisocyanate, 12 ml. of acetone and a drop of pyridine and allowed to dry, about

0.18 g. of isocyanate was retained on the fabric. After standing at a relative humidity of 65% and a temperature of 70° F. for 24 hours, the treated fabric rapidly lost an electrical charge placed on it in marked contrast to the low loss of a similar charge by untreated fabric.

EXAMPLE VII

1,1'-(Oxydiethylenedioxy)Diethyl Diisocyanate

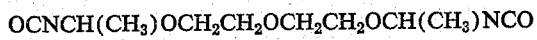
OCNCH(CH₃)OCH₂CH₂OCH₂CH₂OCH(CH₃)NCO

A mixture of 15.8 g. of the divinyl ether of diethylene glycol and 9.1 g. of isocyanic acid cooled to 0° C. was added over a period of one hour to a stirred mixture of 20 ml. of ether and 0.05 g. of p-toluenesulfonic acid. An exothermic reaction occurred. The resulting product was stirred with 1 g. of sodium bicarbonate. The 1,1'-(oxydiethylenedioxy)diethyl diisocyanate was distilled, boiling at 160–170° C./0.3 mm.

Also available by the general procedure of Examples VI and VII are 1,1'-(ethylenedioxy)dihexyl diisocyanate and 1,1'-dimethyl-1-1,1'-(ethylenedioxy)dipentyl diisocyanate and 1,1'-(succinatodiethylenedioxy)diethyl diisocyanate.

EXAMPLE VIII

2-(1-Isocyanatoethoxy)Ethyl Methacrylate

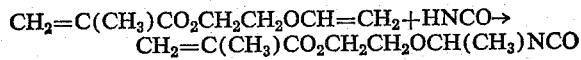
CH₂=C(CH₃)CO₂CH₂CH₂OCH=CH₂+HNCO→
CH₂=C(CH₃)CO₂CH₂CH₂OCH(CH₃)NCO

To a mixture of 10 ml. of isocyanic acid and 25 ml. of benzene was added with stirring over a period of 28 minutes, 31 g. of 2-vinyloxyethyl methacrylate (obtained from Rohm and Haas). The temperature rose to 42° C. during the reaction. Distillation gave 33 g. (83% yield) of 2-(1-isocyanatoethoxy)ethyl methacrylate, B.P. 70° C./0.3 mm.; $n_D^{25}$, 1.4436.

*Analysis.*—Calcd. for $C_9H_{13}O_4N$: N, 7.03. Found: N, 7.01.

The infrared spectrum was consistent with the proposed structure.

2-(1-isocyanatoethoxy)ethyl methacrylate was copolymerized with ethyl acrylate in benzene solution at 50–55° C. using α,α'-azobis(α,γ-dimethylvaleronitrile) as the initiator. Copolymers containing 25% and 50% of 2-(1-isocyanato)ethyl methacrylate air-dried to hard tough coatings on glass; whereas, unmodified polymers of ethyl acrylate were soft, tacky, and soluble in xylene and other solvents. These copolymers were used as adhesives for polyvinyl fluoride and polyethylene terephthalate films.

When 2-vinyloxyethyl acetate is used in place of the methacrylate in the above procedure, there is obtained 2-(1-isocyanatoethoxy)ethyl acetate. By similar method there can also be obtained 2-(1-isocyanatoethoxy)ethyl propiolate, 2-(1-isocyanatoethoxy)ethyl sorbate, 2-(1-isocyanatoethoxy)ethyl benzoate, 3-(1-isocyanatoethoxy)propyl methacrylate, and 2-[2-(1-isocyanatoethoxy)ethoxy]ethyl methacrylate.

When the new isocyanates of this invention are heated to their decomposition temperature, generally above about 200° C., vinyl ethers and isocyanic acid are regenerated and can be employed directly for crosslinking of polyhydroxylated polymers.

When the general conditions of the examples were repeated with divinyl ether and furan, no addition reaction was observed.

The new isocyanates of this invention are generally useful in pesticide applications. The product of Example III (2-tetrahydropyranyl isocyanate) when applied as a 1% solution in acetone kills insects such as two-spotted mite.

The α-isocyanato ethers of this invention are converted to ureas by reaction in acetone solution at room temperature with an amine having hydrogen on amino nitrogen. The ureas thus obtained, and in particular those from aniline, are fungicidal. For example, the phenylureas corresponding to the products of the examples when applied as a 0.2 percent solution on tomato foliage gave substantial protection against the early blight fungus.

New isocyanato ethers that are particularly preferred are those containing a plurality of cyanato groups. These new compounds are useful as treating agents for polymers, e.g., as antistatic agents. They also react with glycols and diamines to form new polymers useful in the production of fibers.

Since obvious modifications in the invention will be evident to those skilled in the chemical arts, I propose to be bound solely by the appended claims.

The embodiments of the invention in which an exclusive property or privilege is claimed are defined as follows:

1. The process of preparing an α-isocyanato ether which comprises reacting isocyanic acid and an ether in which one, and only one, of the carbons attached to the ether oxygen carries a carbon-to-carbon double bond at a temperature between about −80 and 75° C., said ether being hydrocarbon except for the ether function.

2. The process of claim 1 accomplished in the presence of an acid catalyst.

3. The process of claim 1 accomplished in an inert diluent.

4. The process of preparing an α-isocyanato ether which comprises reacting isocyanic acid and a monovinyl ether at a temperature between about −80 and 75° C.

5. The process of preparing an α-isocyanato ether which comprises reacting isocyanic acid and vinyl butyl ether at a temperature between about −80 and 75° C.

6. The process of preparing and α-isocyanato ether which comprises reacting isocyanic acid and vinyl ethyl ether at a temperature between about −80 and 75° C.

7. The process of preparing an α-isocyanato ether which comprises reacting isocyanic acid and dihydropyran at a temperature between about −80 and 75° C.

8. The process of preparing an α-isocyanato ether which comprises reacting isocyanic acid and vinyl phenyl ether at a temperature between about −80 and 75° C.

9. The process of preparing an α-isocyanato ether which comprises reacting isocyanic acid and a divinyl diether in which each ether oxygen is connected to a vinyl radical and the two ether oxygens are connected to each other by a member of the group consisting of hydrocarbon and oxygen-interrupted hydrocarbon radicals of at least two carbons at a temperature between about −80 and 75° C., said diether being hydrocarbon except for the ether functions.

10. The process of preparing an α-isocyanato ether which comprises reacting isocyanic acid and the divinyl diether of ethylene glycol.

11. The process of preparing an α-isocyanato ether which comprises reacting isocyanic acid and an ether having at least two chain oxygens, the first of said oxygens being an ether oxygen attached to a vinyl radical and, through a member of the group consisting of hydrocarbon and oxygen-interrupted hydrocarbon radicals of at least two carbons, to the second of said chain oxygens, said second oxygen being bonded to a carbonyl group attached to a hydrocarbon radical, at a temperature between about −80 and 75° C., the reactant ether being hydrocarbon except for ether oxygen.

12. The process of preparing an α-isocyanato ether which comprises reacting isocyanic acid and 2-vinyloxyethyl methacrylate at a temperature between about −80 and 75° C.

13. An α-isocyanato ether of up to 30 carbons in which one bond of the ether oxygen is attached to a carbon bonded to the isocyanate group and at least one other carbon and the other bond of the ether oxygen is attached to a member of the group consisting of monovalent and divalent hydrocarbon radicals, the second valence of any divalent hydrocarbon radical being attached to the carbon bonded to the isocyanate group.

14. 2-tetrahydropyranyl isocyanate.
15. 1-phenoxyethyl isocyanate.
16. A compound having two ether oxygens and up to 30 carbon atoms, said ether oxygens being connected to each other through a member of the group consisting of hydrocarbon and oxygen-interrupted hydrocarbon radicals of at least two carbons, each of said ether oxygens being also connected to a carbon bearing an isocyanate radical.
17. 1,1'-(ethylenedioxy)diethyl diisocyanate.
18. An ether of up to 30 carbons having at least two chain oxygens one of which is an ether oxygen attached directly to a carbon bearing an isocyanate radical and, through a member of the group consisting of hydrocarbon and oxygen-interrupted hydrocarbon radicals of at least two carbons, to the second of said chain oxygens, said second oxygen being bonded to a carbonyl group attached to a hydrocarbon radical.
19. 2-(1-isocyanatoethoxy)ethyl methacrylate.
20. A polymer of 2-(1-isocyanatoethoxy)ethyl methacrylate.
21. 1,1'-(oxydiethylenedioxy)diethyl diisocyanate.
22. A copolymer of 2-(1-isocyanatoethoxy)ethyl methacrylate and ethyl acrylate.

References Cited in the file of this patent
UNITED STATES PATENTS

| | | |
|---|---|---|
| 2,409,712 | Schweitzer | Oct. 22, 1946 |
| 2,727,020 | Melamed et al. | Dec. 13, 1955 |

OTHER REFERENCES

Jones et al.: Journal American Chemical Society, vol. 46, pages 2518–2533 (1924).

UNITED STATES PATENT OFFICE
CERTIFICATE OF CORRECTION

Patent No. 3,076,788                              February 5, 1963

Fred W. Hoover

It is hereby certified that error appears in the above numbered patent requiring correction and that the said Letters Patent should read as corrected below.

Column 2, line 38, the formula should appear as shown below instead of as in the patent:

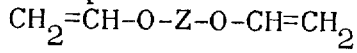
$$CH_2=CH-O-Z-O-CH=CH_2$$

column 5, line 21, beginning with " and 1,1′-dimethyl-" strike out all to and including "diisocyanate." in lines 22 and 23, and insert instead -- and 1,1′′-dimethyl-1,1′′-(ethylenedioxy) dipentyl diisocyanate. --; column 6, line 32, for "and" read -- an --; line 63, for the terminal period substitute -- and carbonyl. --.

Signed and sealed this 3rd day of September 1963.

(SEAL)
Attest:

ERNEST W. SWIDER                                   DAVID L. LADD
Attesting Officer                                      Commissioner of Patents